United States Patent
Choi et al.

(10) Patent No.: US 9,847,876 B2
(45) Date of Patent: Dec. 19, 2017

(54) METHOD AND APPARATUS FOR GENERATING RAW KEY USING DOUBLE BUFFERING SCHEME IN IMPLEMENTING QUANTUM KEY DISTRIBUTION PROTOCOL

(71) Applicant: SK TELECOM CO., LTD., Seoul (KR)

(72) Inventors: Jeongwoon Choi, Yongin-si (KR); Jeongsik Cho, Daejeon (KR)

(73) Assignee: SK TELECOM CO., LTD., Seoul (KR)

( * ) Notice: Subject to any disclaimer, the term of this patent is extended or adjusted under 35 U.S.C. 154(b) by 188 days.

(21) Appl. No.: 14/865,701

(22) Filed: Sep. 25, 2015

(65) Prior Publication Data

US 2016/0013937 A1    Jan. 14, 2016

Related U.S. Application Data

(63) Continuation of application No. PCT/KR2014/006863, filed on Jul. 28, 2014.

(30) Foreign Application Priority Data

Oct. 30, 2013   (KR) .................. 10-2013-0130525

(51) Int. Cl.
*H04L 9/08* (2006.01)
*H04B 10/85* (2013.01)

(52) U.S. Cl.
CPC .......... *H04L 9/0852* (2013.01); *H04B 10/85* (2013.01); *H04L 9/0861* (2013.01); *H04L 9/0894* (2013.01)

(58) Field of Classification Search
CPC ... H04L 9/0852; H04L 9/0861; H04L 9/0894; H04B 10/85
See application file for complete search history.

(56) References Cited

U.S. PATENT DOCUMENTS

| 7,181,011 B2 | 2/2007 | Trifonov | |
| 2002/0012431 A1* | 1/2002 | Wang | H04K 1/02 380/54 |

(Continued)

FOREIGN PATENT DOCUMENTS

| JP | 1997502323 A | 3/1997 |
| KR | 1020030085094 A | 11/2003 |
| KR | 1020080056273 A | 6/2008 |

OTHER PUBLICATIONS

Ruiz-Alba et al., Microwave Photonics Parallel Quantum Key Distribution, Jun. 2012, IEEE Photonics Journal, vol. 4, No. 3, pp. 931-942.*

(Continued)

*Primary Examiner* — Kenneth Chang
(74) *Attorney, Agent, or Firm* — Hauptman Ham, LLP

(57) ABSTRACT

A receiver in a quantum key distribution (QKD) system includes a quantum optical unit configured to receive quantum signals from a transmitter of the QKD system, modulate the quantum signals based on a basis sequence, and output detection information by detecting the modulated quantum signals. The receiver further includes a signal processor configured to generate a raw key by using the detection information and the basis sequence based on a double buffering scheme.

13 Claims, 7 Drawing Sheets

(56) References Cited

U.S. PATENT DOCUMENTS

| | | | |
|---|---|---|---|
| 2004/0042498 A1* | 3/2004 | Furuness | H04J 3/0608 |
| | | | 370/503 |
| 2005/0190921 A1* | 9/2005 | Schlafer | H04L 9/0858 |
| | | | 380/278 |
| 2006/0018475 A1* | 1/2006 | Vig | H04L 9/0852 |
| | | | 380/256 |
| 2006/0062392 A1* | 3/2006 | Lee | H04L 9/0852 |
| | | | 380/278 |
| 2006/0098674 A1* | 5/2006 | Hamasaki | H04J 3/1617 |
| | | | 370/412 |
| 2008/0037790 A1* | 2/2008 | Berzanskis | H04L 9/0852 |
| | | | 380/278 |

OTHER PUBLICATIONS

International Search Report dated Oct. 27, 2014 for PCT/KR2014/006863.

* cited by examiner

METHOD AND APPARATUS FOR GENERATING RAW KEY USING DOUBLE BUFFERING SCHEME IN IMPLEMENTING QUANTUM KEY DISTRIBUTION PROTOCOL

CROSS-REFERENCE TO RELATED APPLICATIONS

The present application is a continuation of International Patent Application No. PCT/KR2014/006863, filed Jul. 28, 2014, which claims priority to Korean Patent Application No. 10-2013-0130525, filed on Oct. 30, 2013, all of which are hereby incorporated by reference in their entirely.

TECHNICAL FIELD

The present disclosure in one or more embodiments relates to a method and apparatus for generating a raw key by using a double buffering scheme in implementing a quantum key distribution (QKD) protocol.

BACKGROUND

The statements in this section merely provide background information related to the present disclosure and do not constitute prior art.

A quantum key distribution (QKD) system helps users safely share a key between a sender and a receiver by protecting against eavesdropping attacks by way of quantum uncertainty (randomness). The QKD system generates a raw key by using quantum communication, calculates a quantum bit error rate (QBER) of the raw key, generates a sifted key, and performs an error correction and privacy amplification on the sifted key so as to generate a final secret key.

In some approaches, a raw key generation process of the QKD system generates a raw key by filtering normally detected events after completing the transmission of quantum signals. In this case, the time taken to perform the QKD is increased by the time taken to perform the filtering. Furthermore, since the QKD system filters the detection events from a significantly large amount of data, the filtering time takes up the majority of the total time of performing QKD and thus the efficiency of QKD is potentially reduced.

SUMMARY

In accordance with some embodiments of the present disclosure, a receiver in a quantum key distribution (QKD) system includes a quantum optical unit configured to receive quantum signals from a transmitter of the QKD system, modulate the quantum signals based on a basis sequence, and output detection information by detecting the modulated quantum signals. The receiver further includes a signal processor configured to generate a raw key by using the detection information and the basis sequence based on a double buffering scheme.

In accordance with some embodiments of the present disclosure, a transmitter in a quantum key distribution (QKD) system includes a signal processor configured to generate and store quantum information, and generate a raw key by using the quantum information and detection event occurrence information received from a receiver of the QKD system based on a double buffering scheme. The transmitter further includes a quantum optical unit configured to transmit quantum signals modulated based on the quantum information, to the receiver over a quantum channel.

In accordance some embodiments of the present disclosure, a method is provided for generating a raw key by a transmitter and a receiver of a quantum key distribution (QKD) system. The method includes, at the receiver, receiving quantum signals from the transmitter, modulating the quantum signals based on a basis sequence, outputting detection event occurrence information by detecting the modulated quantum signals, and sharing the detection event occurrence information with the transmitter. The method further includes generating a raw key by using the detection event occurrence information and the basis sequence based on a double buffering scheme by at least one of the transmitter and the receiver.

DETAILED DESCRIPTION

Hereinafter, at least one embodiment of the present disclosure will be described in detail with reference to the accompanying drawings.

The present disclosure proposes a method for improving the efficiency of a quantum key distribution (QKD) system in the process of generating a raw key by repeatedly generating the raw key in a period shorter than a preset raw key generation time based on an operating environment of the QKD system with a double buffering scheme further applied.

The present disclosure also proposes a method for improving the efficiency of a QKD system by additionally applying a double buffering scheme to a QKD protocol operating process and thus performing not only a raw key generation process but also a final secret key generation process simultaneously with a quantum signal transmission process.

Figure 1:
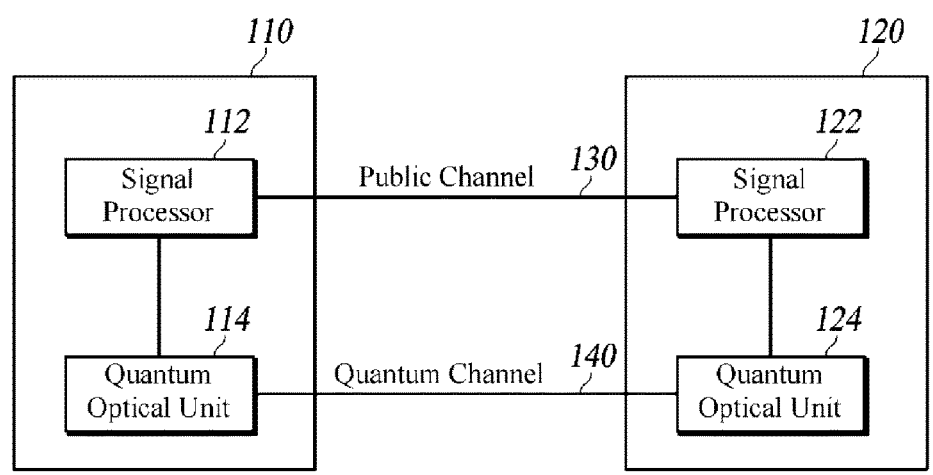
FIG. 1 is a schematic block diagram of a quantum key distribution (QKD) system according to at least one embodiment of the present disclosure.

FIG. 1 is a schematic block diagram of a QKD system according to at least one embodiment of the present disclosure. The following description will concentrate upon a raw key generation stage in a QKD process of the QKD system.

The QKD system includes a transmitter 110 and a receiver 120 which is connected to the transmitter 110 through an open or public channel 130 and a quantum channel 140. The public channel 130 is used for data communication between the transmitter 110 and the receiver 120 and is implemented by, for example, one or more of the Internet, optical fibers carrying strong optical pulses, wireless communication networks, or any other means for data communication. The quantum channel 140 is used in a process for transmitting quantum signals from the transmitter 110 to the receiver 120. Examples of the quantum channel 140 include, but are not limited to, an optical fiber, or a line of sight channel over which photons are transmitted between the transmitter 110 and the receiver 120.

The transmitter 110 includes a signal processor 112 and a quantum optical unit 114.

The signal processor 112 generates arbitrary quantum information by using a random number generator 210 (FIG. 2), and stores the generated quantum information. In this case, the quantum information generated using the random number generator 210 includes at least one of a random-number sequence (bit sequence), a basis sequence and a decoy sequence. After that, the signal processor 112 transmits the quantum information to the quantum optical unit 114. The signal processor 112 includes, for example, an arbitrary computing device including a memory, input/output ports and a processing unit, and is used, for example, to generate and store desired information (e.g., a final secret key). In one or more embodiments, the signal processor 112 includes or operates a communication mechanism (e.g., network interface hardware) which enables communication with the receiver 120 over the public channel 130. In at least one embodiment, the signal processor 112 is implemented by, or includes, one or more processors and/or application-specific integrated circuits (ASICs) specified for respectively corresponding operations and functions described herein in the present disclosure.

Upon receiving detection event occurrence information from the receiver 120 over the public channel 130, the signal processor 112 generates a raw key by using the detection event occurrence information and the quantum information. The detection event occurrence information received by the signal processor 112 from the receiver 120 includes the location information of where detection events are extracted as normal within detection information by the receiver 120 in the process of generating a raw key. The signal processor 112 utilizes the detection event occurrence information to extract a random number sequence mapped to the detection event occurrence information, and generates and stores a raw key based on the extracted random number sequence. The signal processor 112 extracts and stores, as a raw key, quantum information corresponding to the extracted random number sequence in the course of extracting the random number sequence mapped to the detection event occurrence information.

The signal processor 112 according to at least one embodiment of the present disclosure generates a raw key by using a double buffering scheme. The double buffering scheme is for simultaneously storing and processing data, wherein a processing unit is configured to process data of a second buffer while data is being stored in a first buffer. To this end, the QKD system according to at least one embodiment of the present disclosure is configured to generate a raw key during a certain period t that is temporally shorter than a preset raw key generation time T based on an operating environment of the QKD system. As such, the QKD system repeatedly performs a raw key generation process during the preset raw key generation time. In at least one embodiment, the signal processor 112 of the transmitter 110 generates and stores the quantum information based on a certain period during the preset raw key generation time, and repeatedly extracts and stores a raw key by using the quantum information and the detection event occurrence information. The double buffering is performed using a plurality of memory areas allocated at a preset ratio in a memory of an integrated circuit of the signal processor 112 according to at least one embodiment of the present disclosure. For example, the signal processor 112 performs a raw key generation process in a certain period that is temporally shorter than the preset raw key generation time, and controls the storing of a quantum information and detection event occurrence information collected during the raw key generation process, in any one of the plurality of memory areas, e.g., in a first memory area. After that, when the certain period has passed and a new period starts, the signal processor 112 stores newly collected quantum information and detection event occurrence information in another memory area, e.g., in a second memory area. Furthermore, at the same time, the signal processor 112 extracts a raw key from the quantum information and the detection event occurrence information stored in the previous (e.g., first) memory area in the previous period. In this way, the QKD system according to at least one embodiment of the present disclosure can improve its efficiency by eliminating or reducing the time taken to extract raw keys from contributing to the total time taken to perform QKD. In addition, in one or more embodiments, the QKD system generates the raw keys using the existing memory without additionally providing a high-capacity storage device.

The signal processor 112 stores raw keys by using raw key memories allocated in the memory area integrated therein. The raw key memories store extracted raw keys and additionally store quantum information corresponding to the raw keys. The signal processor 112 generates a final raw key based on the raw key stored in one of the raw key memories after the preset raw key generation time has lapsed. For example, the signal processor 112 generates a final raw key based on the raw key accumulatively stored in the raw key memories at the end of the preset raw key generation time (T). The present disclosure according to at least one embodiment provides a plurality of raw key memories which are used for storing the raw keys in parallel with performing a QKD protocol using the stored raw keys and a post-processing protocol. For example, the signal processor 112 performs remaining parts of QKD protocol and a post-processing protocol based on the raw key stored accumulatively in one raw key memory. At the same time, the signal processor 112 stores accumulatively raw keys, extracted from the quantum information and the detection event occurrence information, in other raw key memory.

The signal processor 112 according to at least one embodiment of the present disclosure performs a raw key generation process using a static memory or a cache memory integrated in the integrated circuit of the signal processor 112 without additionally using a high-capacity external memory, by reducing a raw key generation period and applying a double buffering scheme to the raw key generation process. This, in one or more embodiments, enables more efficient communications between the integrated circuit and the memory of the signal processor 112 and, in turn, enhances the performance of the raw key generation process.

When the QKD system according to at least one embodiment of the present disclosure operates using a decoy scheme, the signal processor 112 accumulatively counts information stored in the plurality of memory areas and information stored in the raw key memories for each of the quantum signal types, e.g., the intensities of quantum signals. The decoy scheme-QKD system utilizes a method for arbitrarily modifying the amplitude of a laser generated from a pulse laser source, based on a decoy sequence. In some embodiments, a decoy scheme performs a 3-step amplitude modulation. To implement the decoy scheme in the QKD system, a ratio of normal detection events to generated signals is calculated based on the types of quantum signals during a raw key generation time. In some situations, there is a concern with respect to performance of such a calculation due to the double buffering scheme applied where information stored in the memory is valid only during a certain period. Therefore, the signal processor 112 according to at least one embodiment of the present disclosure accumulatively counts the information stored in the plurality of memory areas and the information stored in the raw key memories according to the type of each quantum signal, and thus operates to calculate a ratio of normal detection events to generated signals for each quantum signal type. As such, the QKD system according to at least one embodiment of the present disclosure is implementable based on a decoy scheme.

The quantum optical unit 114 transmits quantum signals modulated based on the quantum information received from the signal processor 112, to the receiver 120 over the quantum channel 140. For this purpose, the quantum optical unit 114 includes, in one or more embodiments, a pulse laser source configured to output an optical pulse sequence, a Mach-Zehnder interferometer or a Michelson interferometer used in generating a pair of temporally separated optical pulses using two paths having different lengths, a phase modulator located on any one of the paths of the interferometer, and a variable optical attenuator configured to reduce an average number of photons per pulse to an appropriate level. The components included in the quantum optical unit 114, in one or more embodiments, vary depending on a protocol, a coding scheme and a possible implementation thereof.

The receiver 120 includes a signal processor 122 and a quantum optical unit 124.

The signal processor 122 generates arbitrary quantum information, e.g., a basis sequence, by using a random number generator 310 (FIG. 3), and stores the generated basis sequence. After that, the signal processor 122 transmits the basis sequence to the quantum optical unit 124. The receiver 120 includes, for example, a computer including a memory, input/output ports and a processing unit configured to manage operations for generating and storing desired information (e.g., a final secret key). In one or more embodiments, the signal processor 122 includes or operates a communication mechanism (e.g., network interface hardware) which enables communications with the transmitter 110 over the public channel 130. In at least one embodiment, the signal processor 122 is implemented by, or includes, one or more processors and/or application-specific integrated circuits (ASICs) specified for respectively corresponding operations and functions described herein in the present disclosure.

In addition, the signal processor 122 receives, from the quantum optical unit 124, detection information detected by the quantum optical unit 124 based on quantum signals received from the transmitter 110 over the quantum channel 140 and generates a raw key by using the received detection information and the basis sequence. In one or more embodiments, the signal processor 122 detects where normal detection events have occurred, and generates and stores a raw key by filtering the detected events only. In at least one embodiment, the signal processor 122 additionally extracts and stores a basis sequence corresponding to the detected events.

The signal processor 122 according to at least one embodiment of the present disclosure generates a raw key by applying a double buffering scheme to a raw key generation process. Based on a certain period shorter than a preset raw key generation time, the signal processor 122 repeatedly performs an operation of storing the detection information and the generated basis sequence during the preset raw key generation time, and an operation of generating and storing a raw key by using the detection information and the basis sequence. The signal processor 122 according to at least one embodiment of the present disclosure performs the double buffering by using a plurality of memory areas allocated at a preset rate in a memory area of an integrated circuit in the signal processor 122. For example, the signal processor 122 performs a raw key generation process in a certain period shorter than the preset raw key generation time, and controls the storage of a basis sequence and detection information collected during the raw key generation process, in any one of the plurality of memory areas, e.g., in a first memory area. After that, when the certain period has passed and a new period starts, the signal processor 122 stores a newly collected basis sequence and detection information in an alternate memory area, e.g., in a second memory area. Furthermore, at the same time, the signal processor 122 extracts a raw key by using the basis sequence and the detection information stored in the previous (e.g., first) memory area in the previous period.

In at least one embodiment, the signal processor 122 stores raw keys by using raw key memories allocated in the memory integrated therein. In this case, the raw key memories store extracted raw keys and additionally store basis sequences corresponding to the raw keys. The signal processor 122 generates a final raw key based on the raw keys stored in the raw key memories after the preset raw key generation time has lapsed. At least one embodiment of the present disclosure is provided with a plurality of raw key memories for storing the raw keys in parallel with performing a QKD protocol using the raw keys and a post-processing protocol.

The quantum optical unit 124 modulates the quantum signals received from the transmitter 110, based on the quantum information, e.g., the basis sequence, received from the signal processor 122, and detects the modulated quantum signals to output detection information. To this end, the quantum optical unit 124 includes, in one or more embodiments, a phase modulator and single photon detectors (SPDs). In at least one embodiment, the SPDs are implemented as an avalanche photo diode (APD) operating in Geiger mode, and the phase modulator is replaced with a polarization beam splitter and a polarizing filter in the case of a polarization modulation scheme. The components included in the quantum optical unit 124, in one or more embodiments, vary depending on a protocol, a coding scheme and a considered implementation.

Figure 2:
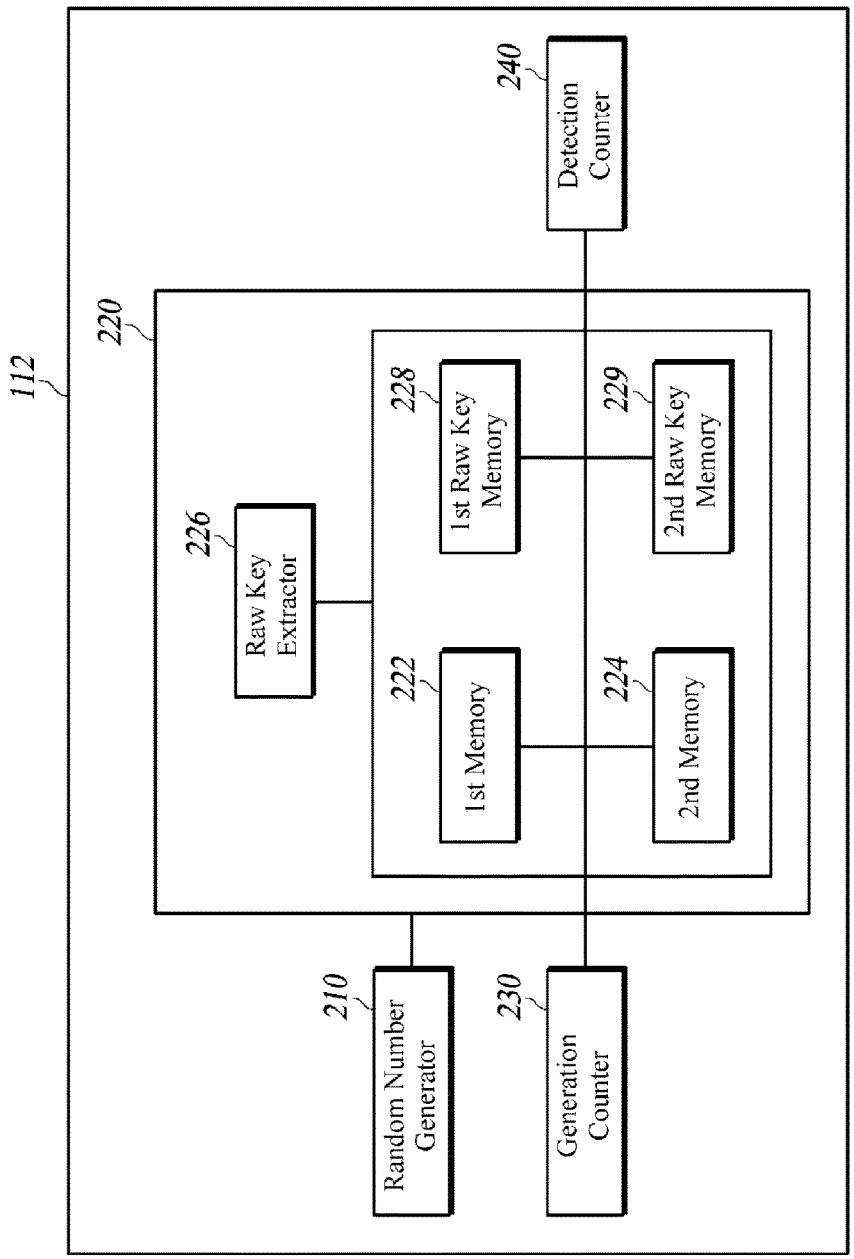
FIG. 2 is a schematic block diagram of a signal processor of a transmitter according to at least one embodiment of the present disclosure.

FIG. 2 is a schematic block diagram of the signal processor 112 of the transmitter 110 according to at least one embodiment of the present disclosure.

As illustrated in FIG. 2, the signal processor 112 of the transmitter 110 according to at least one embodiment of the present disclosure includes the random number generator 210 and an integrated circuit 220; however, the components included in the signal processor 112 according to at least one embodiment of the present disclosure are not limited thereto.

The random number generator 210 is a hardware or a program configured to generate specific-sized random numbers, and generates arbitrary quantum information. In at least one embodiment when the random number generator 210 is a program, the program is executable by hardware, e.g., the integrated circuit 220. The quantum information generated by the random number generator 210 includes at least one of a random number sequence, a basis sequence and a decoy sequence.

The integrated circuit 220 is a hardware device, e.g., a chip, configured to control functions performed by the transmitter 110. The integrated circuit 220 according to at least one embodiment of the present disclosure includes a first memory 222, a second memory 224, a raw key extractor 226, a first raw key memory 228 and a second raw key memory 229. The first and second memories 222 and 224, and the first and second raw key memories 228 and 229 are allocated at a preset rate in a static memory, e.g., a static random access memory (SRAM), or a cache memory, embedded in the integrated circuit 220. Other memory arrangements are within the scope of various embodiments.

The first and second memories 222 and 224 store the quantum information and detection event occurrence information. Specifically, the first and second memories 222 and 224 alternately store the quantum information and the detection event occurrence information based on a certain period (t) shorter than a preset raw key generation time (T) when the double buffering scheme is applied. For example, when the first memory 222 stores quantum information and detection event occurrence information collected in a raw key generation process during a certain period, the collected quantum information and detection event occurrence information are stored in the second memory 224 during the subsequent period. The information stored in each memory of the first and second memories 222 and 224 is maintained during a certain period (t), and it is removed thereafter (or replaced with newly collected quantum information and detection event occurrence information in a subsequent period).

The raw key extractor 226 extracts a raw key by alternately using the quantum information and the detection event occurrence information stored alternately in the first or second memory 222 or 224. The raw key extractor 226 controls to store, in the first or second memory 222 or 224 (e.g., in the first memory 222), quantum information and detection event occurrence information collected in a raw key generation process during a certain period (t) shorter than the preset raw key generation time (T). After that, when the certain period has passed and a new period starts, the raw key extractor 226 controls to store newly collected quantum information and detection event occurrence information in the other memory (e.g., in the second memory 224). Furthermore, at the same time, the raw key extractor 226 performs double buffering by extracting a raw key from the previous memory (e.g., from the first memory 222) that stored the quantum information and the detection event occurrence information in the previous period.

Utilizing the first and second raw key memories 228 and 229, the raw key extractor 226 operates to control to store a raw key in either one of the two memories 228 and 229 (e.g., in the first raw key memory 228) and, at the same time, to implement a QKD protocol and a post-processing protocol by using a raw key previously stored in the other raw key memory (e.g., in the second raw key memory 229).

The first and second raw key memories 228 and 229 each accumulatively store a raw key extracted from the first and second memory 222 or 224, based on the double buffering technique. For example, the first raw key memories 228 accumulatively store raw keys extracted alternately from the first and second memory 222 and 224 in the preset raw key generation time (T), and the second raw key memories 229 accumulatively store raw keys extracted alternately from the first and second memory 222 and 224 in a subsequent preset raw key generation time A generation counter 230 accumulatively counts the information stored in the first and second memories 222 and 224 based on the types of quantum particles. A detection counter 240 accumulatively counts the information stored in the first and second raw key memories 228 and 229 based on the types of quantum particles. When the QKD system according to at least one embodiment of the present disclosure is implemented using a decoy scheme, a ratio of normal detection events to generated signals is calculated based on the types of quantum signals during a raw key generation time. In some situations, there is a concern with respect to performance of such a calculation due to the double buffering scheme applied where information stored in the memory is valid only during a certain short period. Therefore, the signal processor 112 according to at least one embodiment of the present disclosure includes the generation counter 230 and the detection counter 240, and thus operates to calculate a ratio of normal detection events to generated signals for each quantum signal type. As such, the QKD system according to at least one embodiment of the present disclosure is implementable based on a decoy scheme. Although a single generation counter 230 and a single detection counter 240 are illustrated in FIG. 2, a plurality of generation counters and/or detection counters are used in one or more embodiments to accumulatively count the information stored in the memory for each quantum signal type. In at least one embodiment, one or more of the generation counter 230 and detection counter 240 is implemented as a separate hardware component. In at least one embodiment, one or more of the generation counter 230 and detection counter 240 is implemented as a program executable by the integrated circuit 220.

Figure 3:
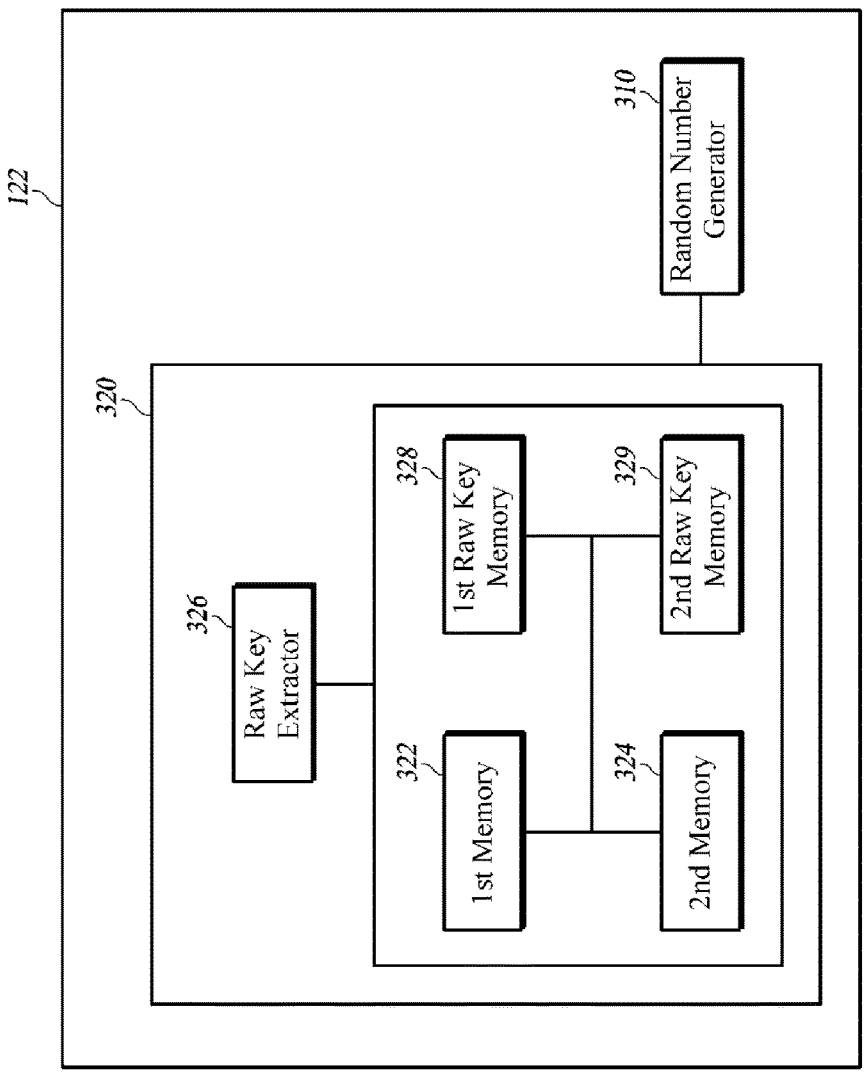
FIG. 3 is a schematic block diagram of a signal processor of a receiver according to at least one embodiment of the present disclosure.

FIG. 3 is a schematic block diagram of the signal processor 122 of the receiver 120 according to at least one embodiment of the present disclosure. As illustrated in FIG. 3, the signal processor 122 of the receiver 120 according to at least one embodiment of the present disclosure includes the random number generator 310 and an integrated circuit 320; however, the components included in the signal processor 122 according to at least one embodiment of the present disclosure are not limited thereto.

The random number generator 310 is a hardware or a program configured to generate specific-sized random numbers, and generates arbitrary quantum information. In at least one embodiment when the random number generator 310 is a program, the program is executable by hardware, e.g., the integrated circuit 320. Although the random number generator 310 generates basis sequence information as the quantum information in FIG. 3, the quantum information is not limited thereto.

The integrated circuit 320 is a hardware device, e.g., a chip, configured to control functions performed by the receiver 120. The integrated circuit 320 according to at least one embodiment of the present disclosure includes a first memory 322, a second memory 324, a raw key extractor 326, a first raw key memory 328 and a second raw key memory 329. The first and second memories 322 and 324, and the first and second raw key memories 328 and 329 are allocated at a preset rate in a static memory e.g., a SRAM or a cache memory, embedded in the integrated circuit 320. Other memory arrangements are within the scope of various embodiments.

The first and second memories 322 and 324 store detection information and a basis sequence. Specifically, the first and second memories 322 and 324 alternately store the detection information and the basis sequence collected based on a certain period (t) shorter than a preset raw key generation time (T), based on the double buffering technique. The information stored in each memory of the first and second memories 322 and 324 is maintained during the certain period (t), and it is removed thereafter (or replaced with newly collected detection information and basis sequence in a subsequent period).

The raw key extractor 326 extracts a raw key by using the detection information and the basis sequence stored in the first or second memory 322 or 324. The raw key extractor 326 controls to store, in the first or second memory 322 or 324 (e.g., in the first memory 322), detection information and a basis sequence collected in a raw key generation process during a certain period shorter than the preset raw key generation time. After that, when the certain period has passed and a new period starts, the raw key extractor 326 controls to store newly collected detection information and a basis sequence in the other memory (e.g., in the second memory 324). Furthermore, at the same time, the raw key extractor 326 extracts a raw key from the previous memory (e.g., from the first memory 322) that stored the detection information and the basis sequence in the previous period.

Utilizing the first and second raw key memories 328 and 329, the raw key extractor 326 operates to control to accumulatively store a raw key, extracted from the first and second memory 322 and 324, in either one of the two memories 328 and 329 (e.g., in the first raw key memory 328) and, at the same time, to implement a QKD protocol and a post-processing protocol by using a raw key previously stored in the other raw key memory (e.g., in the second raw key memory 329).

The first and second raw key memories 328 and 329 each accumulatively store a raw key extracted based on the information stored in the first or second memory 322 and 324. In other words, the first and second raw key memories 328 and 329 alternately and accumulatively store raw keys extracted alternately from the first and second memory 222 and 224 in the preset raw key generation time, based on the double buffering technique.

Figure 4:
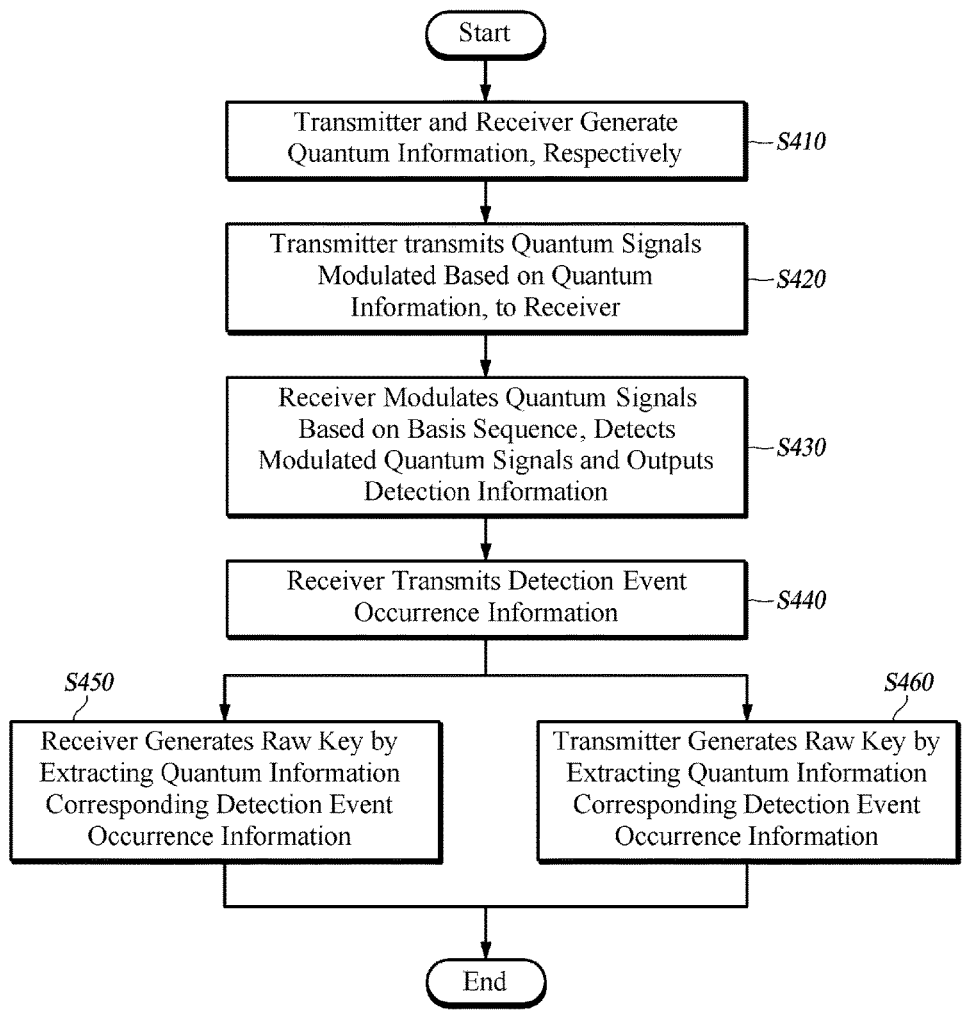
FIG. 4 is a flowchart of a method for generating a raw key, according to at least one embodiment of the present disclosure.

FIG. 4 is a flowchart of a method for generating a raw key according to at least one embodiment of the present disclosure. A raw key generation process according to at least one embodiment of the present disclosure is performed during a certain period (t) shorter than a preset raw key generation time (T) based on an operating environment of the QKD system. As such, the QKD system according to at least one embodiment of the present disclosure repeatedly performs the raw key generation process during the preset raw key generation time for each predetermined period.

As illustrated in FIG. 4, in the raw key generation method according to at least one embodiment of the present disclosure, each of the transmitter 110 and the receiver 120 initially generates arbitrary quantum information (S410). In Step S410, the transmitter 110 generates at least one of a random number sequence, a basis sequence and a decoy sequence, and the receiver 120 generates a basis sequence as the quantum information, although the transmitter 110 and the receiver 120 are not limited to those particular operations.

The transmitter 110 transmits quantum signals modulated based on the generated quantum information, to the receiver 120 (S420). Specifically, the transmitter 110 modulates a laser generated from a pulse laser source based on one or more of the random number sequence, the basis sequence and the decoy sequence, by using a phase modulator and a variable optical attenuator and thereby generating quantum signals. The transmitter 110 transmits the generated quantum signals to the receiver 120.

The receiver 120 modulates the quantum signals received in Step S420, based on the quantum information generated by the receiver 120, e.g., based on the generated basis sequence, and detects the modulated quantum signals to output detection information (S430). In at least one embodiment, the receiver 120 modulates the quantum signals received from the transmitter 110, based on the basis sequence, by using a phase modulator, and then detects modulated quantum signals by using SPDs to output detection information.

The receiver 120 observes where normal detection events (in which, e.g., quantum signal is detected in either of the SPDs) occurred in the detection information detected in Step S430, and transmits detection event occurrence information to the transmitter 110 based on the result of observation (S440). In at least one embodiment, the receiver 120 observes where normal detection events occurred in the detection information, and generates and transmits the detection event occurrence information (e.g., location information of the normal detection events) to the transmitter 110.

The receiver 120 generates a raw key by using the detection information and the quantum information (S450). In at least one embodiment, the receiver 120 filters only where normal detection events occurred in the detection information based on the detection event occurrence information extracted in Step S440 to generate a raw key. In this case, the receiver 120 additionally generates and stores a basis sequence corresponding to the positions where the detected events occurred normally in the detection information.

The transmitter 110 generates a raw key by using the detection event occurrence information and the quantum information (S460). That is, the transmitter 110 receives the detection event occurrence information from the receiver 120 in Step S440. The transmitter 110 utilizes the received detection event occurrence information for extracting a random number sequence mapped to the detection event occurrence information, and generates and stores a raw key based on the extracted random number sequence. When extracting the random number sequence mapped to the detection event occurrence information, the transmitter 110 additionally generates and stores quantum information corresponding to the extracted random number sequence.

The transmitter 110 and the receiver 120 according to at least one embodiment of the present disclosure repeatedly perform Steps S410 to S460 during a certain period t shorter than a preset raw key generation time T based on an operating environment of the QKD system. The transmitter 110 and the receiver 120 each generate a final raw key based on the corresponding extracted and stored raw keys. In at least one embodiment, the transmitter 110 and the receiver 120 generate the raw keys by applying a double buffering scheme to the raw key generation process through Steps S410 to S460.

Although Steps S410 to S460 are described as being sequentially performed in FIG. 4, the order of Steps S410 to S460 is not limited thereto. In some embodiments, Steps S410 to S460 illustrated in FIG. 4 are performed in a different order and/or two or more of these steps are performed in parallel. As such, FIG. 4 is not limited to a particular time-series order.

Figure 5:
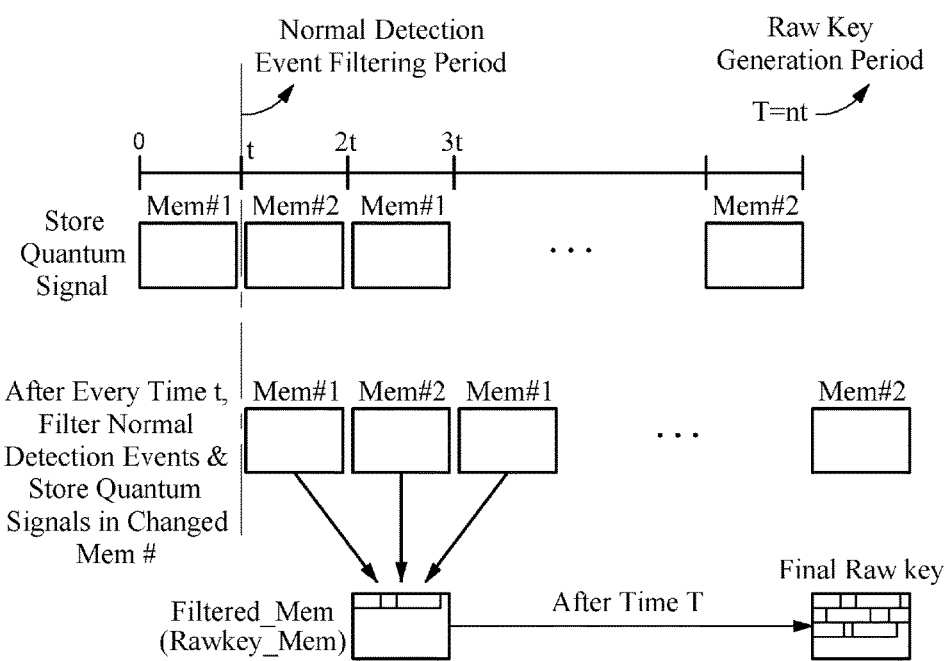
FIG. 5 is an exemplary diagram for describing a method for generating a raw key by using a double buffering scheme, according to at least one embodiment of the present disclosure.

FIG. 5 is a schematic diagram for describing a method for generating a raw key by using a double buffering scheme, according to at least one embodiment of the present disclosure.

As illustrated in FIG. 5, the QKD system according to at least one embodiment of the present disclosure is configured to perform Steps S410 to S460 of FIG. 4 during a certain period t shorter than a raw key generation time T that is preset based on an operating environment of the QKD system. As such, the QKD system repeatedly performs a raw key generation process during the preset raw key generation time. The transmitter 110 and the receiver 120 of the QKD system according to at least one embodiment of the present disclosure include a plurality of memories and perform a double buffering process. For example, each of the transmitter 110 and the receiver 120 performs Steps S410 to S460 during certain period t shorter than the preset raw key generation time T, and controls to store, in any one of the plurality of memories, information collected when steps S410 to S460 are performed. After that, when the certain period has passed and a new period starts, each of the transmitter 110 and the receiver 120 stores, in another memory, new information collected in the new period. Furthermore, at the same time in the new period, each of the transmitter 110 and the receiver 120 extracts a raw key from the collected information stored in the previous memory in the previous period. After that, each of the transmitter 110 and the receiver 120 accumulatively stores the extracted raw key in one of a plurality of raw key memories. After the preset raw key generation time T has lapsed, each of the transmitter 110 and the receiver 120 extracts the raw keys accumulatively stored in the raw key memory, as a final raw key. The final raw key extracted from the raw key memory is used in a QKD protocol and a post-processing protocol.

Figure 6A:
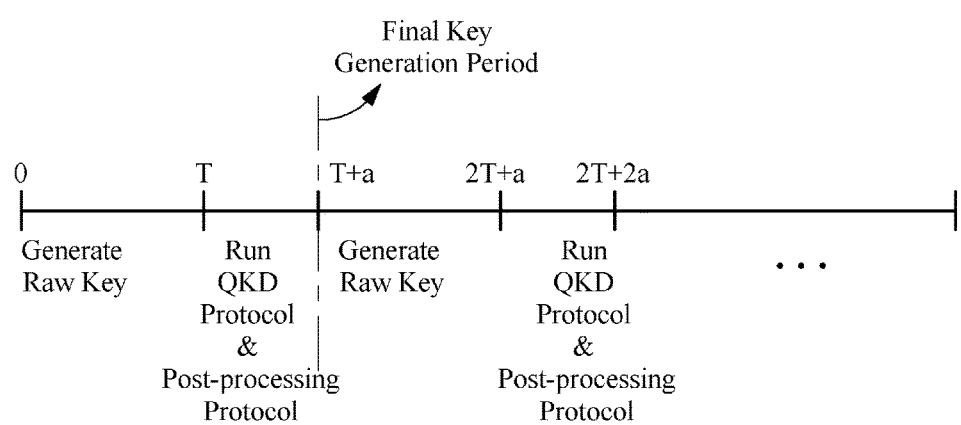
FIGS. 6A-6B are exemplary diagrams for describing a method for generating a raw key and a final secret key by using a double buffering scheme, according to at least one embodiment of the present disclosure.
Figure 6B:
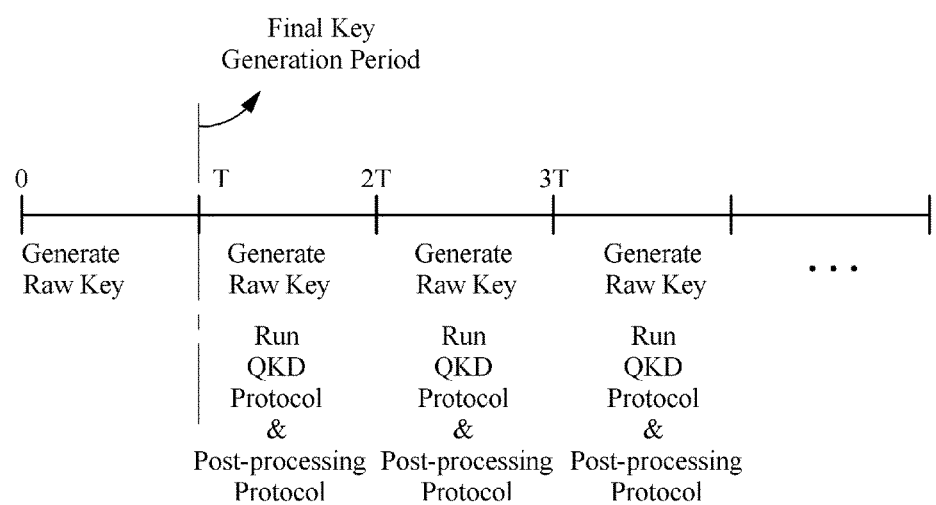

FIGS. 6A and 6B are schematic diagrams for describing a method for generating a final raw key and a final secret key by using a double buffering scheme, according to at least one embodiment of the present disclosure.

As illustrated in FIGS. 6A-6B, there are two modes for performing the method for storing a final raw key and generating a final secret key by using a double buffering scheme according to at least one embodiment of the present disclosure. The QKD system according to at least one embodiment of the present disclosure performs the method for storing a final raw key and generating a final secret key in a first mode with a single raw key storage memory, and in a second mode with multiple raw key storage memories.

FIG. 6A shows a method for generating final raw keys and final secret keys using a single raw key memory, in a conventional transmitter and receiver.

As illustrated in FIG. 6A, the QKD system generates a final secret key by generating a final raw key during a preset raw key generation time T and implementing a QKD protocol and a post-processing protocol by using the final raw key stored in the single raw key memory, during a secret key generation period a (between T and T+a). Then, in one or more embodiments, the QKD system repeatedly performs the above-described process for generating final raw keys and final secret keys.

FIG. 6B shows a method for generating final raw keys and final secret keys using multiple raw key memories, in the transmitter 110 and the receiver 120 in accordance with some embodiments.

As illustrated in FIG. 6B, the QKD system according to at least one embodiment of the present disclosure sets up a preset raw key generation time and accordingly performs the generating of a final secret key by generating and storing a final raw key while implementing a QKD protocol and a post-processing protocol by using a previously generated and stored final raw key. The QKD system according to at least one embodiment of the present disclosure includes a plurality of raw key memories and thus stores a generated final raw key in one raw key memory, while implementing a QKD protocol and a post-processing protocol by using a final raw key previously generated and stored in another raw key memory. As such, the QKD system simultaneously generates a final raw key and a final secret key. This mode of operation is applicable in one or more embodiments because the preset raw key generation time T is longer than time 'a' taken to generate the final secret key by performing the QKD protocol and the post-processing protocol, and it is efficient in that the time taken to generate the final secret key is much less than that of the first mode of FIG. 6A, in some embodiments.

Some embodiments of the present disclosure provide a method and apparatus for generating a final raw key by using a double buffering scheme to increase a key generation speed of a QKD system.

At least one embodiment of the present disclosure repeats a raw key generation process performed in a period shorter than a preset raw key generation time based on an operation environment of a quantum key distribution (QKD) system, and simultaneously performs a quantum signal transmission process and a detection event occurrence information filtering process by using a double buffering scheme. In addition, at least one embodiment alternately performs both a raw key storing process and an implementation of QKD protocol by operating a raw key memory based on a double buffering scheme. This prevents the time taken to perform filtering when the QKD system generates a raw key and the time taken to operate a QKD protocol and a post-processing protocol from adding up to the total time to perform QKD and thereby improving the overall efficiency of the QKD system.

In some embodiments, in the process of generating the raw key and the final secret key, the QKD system uses a double buffering scheme obviating the need for a separate high-capacity external memory for generating the raw key by using a static memory or a cache memory integrated inside of a signal processor to enable information stored in the memory to be rapidly processed.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the explicitly described above embodiments.

The invention claimed is:

1. A receiver in a quantum key distribution (QKD) system, the receiver comprising:
    a quantum optical unit configured to
        receive quantum signals from a transmitter of the QKD system,
        modulate the quantum signals based on a basis sequence, and
        output detection information by detecting the modulated quantum signals; and
    a signal processor configured to generate a raw key by using the detection information and the basis sequence based on a double buffering scheme, wherein the signal processor comprises:
a first memory and a second memory configured to store the detection information and the basis sequence;
a raw key extractor configured to extract the raw key; and
at least one raw key memory configured to store the raw key,
wherein the raw key extractor is configured
to control a storage of the detection information and the basis sequence in one of the first and second memories, and
to store the detection information and the basis sequence in the other of the first and second memories when a preset period has ended,
wherein the preset period is shorter than a preset raw key generation time which is determined based on an operating environment of the QKD system.

2. The receiver of claim 1, wherein the raw key extractor is configured to control a storage of the detection information and the basis sequence by using the first memory and the second memory in parallel with extracting the raw key.

3. The receiver of claim 1, wherein
the at least one raw key memory comprises a plurality of raw key memories, and
the raw key extractor is configured to control a storage of the raw key by using the plurality of raw key memories in parallel with performing a QKD protocol using the raw key and a post-processing protocol.

4. The receiver of claim 1, wherein
the signal processor comprises an integrated circuit comprising the raw key extractor, and
the first memory, the second memory and the raw key memory are allocated at a preset rate in a memory embedded in the integrated circuit.

5. A receiver in a quantum key distribution (QKD) system, the receiver comprising:
a quantum optical unit configured to
receive quantum signals from a transmitter of the QKD system,
modulate the quantum signals based on a basis sequence, and
output detection information by detecting the modulated quantum signals; and
a signal processor configured to generate a raw key by using the detection information and the basis sequence based on a double buffering scheme,
wherein the signal processor comprises:
a first memory and a second memory configured to store the detection information and the basis sequence;
a raw key extractor configured to extract the raw key; and
at least one raw key memory configured to store the raw key,
wherein the raw key extractor is configured to
store the detection information and the basis sequence collected in a first preset period in the first memory,
store the detection information and the basis sequence collected in a second preset period in the second memory, the second preset period subsequent to the first preset period, and
store the detection information and the basis sequence collected in a third preset period in the first memory, the third preset period subsequent to the second preset period.

6. The receiver of claim 5, wherein the raw key extractor is configured to
while storing the detection information and the basis sequence collected in the second preset period in the second memory,
extract the raw key using the detection information and the basis sequence previously collected and stored in the first memory, and
while storing the detection information and the basis sequence collected in the third preset period in the first memory,
extract the raw key using the detection information and the basis sequence previously collected and stored in the second memory.

7. The receiver of claim 6, wherein the at least one raw key memory comprises a first raw key memory and a second raw key memory, and the raw key extractor is configured to
while performing a QKD protocol and a post-processing protocol using a final raw key previously generated and stored in the first raw key memory,
generate and store a subsequent final raw key in the second raw key memory.

8. A transmitter in a quantum key distribution (QKD) system, the transmitter comprising:
a signal processor configured to
generate and store quantum information, and
generate a raw key by using the quantum information and detection event occurrence information received from a receiver of the QKD system based on a double buffering scheme; and
a quantum optical unit configured to transmit quantum signals, modulated based on the quantum information, to the receiver over a quantum channel,
wherein the signal processor comprises:
a first memory and a second memory configured to store the quantum information and the detection event occurrence information;
a raw key extractor configured to extract the raw key; and
at least one raw key memory configured to store the raw key, and
wherein the signal processor further comprises:
at least one generation counter configured to accumulatively count information stored in the first and second memories for each type of the quantum signals; and
at least one detection counter configured to accumulatively count information stored in the raw key memory.

9. The transmitter of claim 8, wherein the quantum information comprises at least one of a random number sequence, a basis sequence and a decoy sequence.

10. The transmitter of claim 8, wherein
the signal processor comprises an integrated circuit comprising the raw key extractor, and
the first memory, the second memory and the raw key memory are allocated at a preset rate in a memory embedded in the integrated circuit.

11. The transmitter of claim 8, wherein
the quantum information comprises a decoy sequence, and
the signal processor is configured to calculate a ratio of normal detection events to generated signals for each of the types of the quantum signals, based on the accumulatively counted information outputted by the generation counter and the detection counter.

12. A method for generating a raw key by a transmitter and a receiver of a quantum key distribution (QKD) system, the method comprising:
by the receiver,
receiving quantum signals from the transmitter,
modulating the quantum signals based on a basis sequence,
outputting detection event occurrence information by detecting the modulated quantum signals, and sharing the detection event occurrence information with the transmitter; and by at least one of the transmitter and the receiver generating a raw key by using the detection event occurrence information and the basis sequence based on a double buffering scheme, wherein the method further comprises storing the detection information and the basis sequence in a first memory and a second memory, wherein the storing of the detection information and the basis sequence comprises:

storing the detection information and the basis sequence collected in a first preset period in the first memory;

storing the detection information and the basis sequence collected in a second preset period in the second memory, the second preset period subsequent to the first preset period; and storing the detection information and the basis sequence collected in a third preset period in the first memory, the third preset period subsequent to the second preset period.

13. The method of claim 12, wherein the generating comprises storing the raw key by using a plurality of raw key memories in parallel with performing a QKD protocol using the raw key and a post-processing protocol.

* * * * *